United States Patent [19]

Heide et al.

[11] 4,456,400

[45] Jun. 26, 1984

[54] PROCESS OF SAFELY DISPOSING OF WASTE MATERIALS

[76] Inventors: Günter Heide, Feldburgweg 36a, D 4154 Tönisvorst 1; Hans Wagner, Hochbendweg 4 c, D 4150 Krefeld, both of Fed. Rep. of Germany

[21] Appl. No.: 387,854

[22] PCT Filed: Oct. 21, 1981

[86] PCT No.: PCT/EP81/00168

§ 371 Date: Jun. 4, 1982

§ 102(e) Date: Jun. 4, 1982

[87] PCT Pub. No.: WO82/01331

PCT Pub. Date: Apr. 29, 1982

[30] Foreign Application Priority Data

Oct. 21, 1980 [DE] Fed. Rep. of Germany ....... 3039660
Nov. 1, 1980 [DE] Fed. Rep. of Germany ....... 3044436

[51] Int. Cl.$^3$ .................... B09B 3/00; E02D 3/12
[52] U.S. Cl. ........................ 405/128; 405/266; 405/270
[58] Field of Search ............... 405/128, 129, 266, 267, 405/263, 270; 106/85, 109; 404/75, 76

[56] References Cited

U.S. PATENT DOCUMENTS

| | | | |
|---|---|---|---|
| 3,718,003 | 2/1973 | Cook et al. | 405/129 |
| 4,116,705 | 9/1978 | Chappell | 106/90 |
| 4,226,630 | 10/1980 | Styron | 106/85 |
| 4,313,762 | 2/1982 | Pound | 405/129 X |
| 4,374,672 | 2/1983 | Funston et al. | 405/129 X |

FOREIGN PATENT DOCUMENTS

| | | |
|---|---|---|
| 2130309 | 12/1972 | Fed. Rep. of Germany . |
| 2456225 | 6/1975 | Fed. Rep. of Germany . |
| 2724599 | 12/1978 | Fed. Rep. of Germany . |
| 2925882 | 8/1980 | Fed. Rep. of Germany . |
| 80056 | 7/1978 | Luxembourg . |

OTHER PUBLICATIONS

Chemical Abstracts, vol. 74 represented by East German Pat. No. 72 998, p. 140.

*Primary Examiner*—David H. Corbin
*Attorney, Agent, or Firm*—Karl F. Ross; Herbert Dubno

[57] ABSTRACT

In a process of safely disposing of waste materials which are solid or contained in aqueous liquids, wherein the waste material is treated with alkaline substances and a solid product is formed, the waste materials which are solid or dissolved or suspended in aqueous liquids are mixed in accordance with the invention with brown coal ash and, if desired, with water, to obtain a homogeneous mixture having the consistency of a pulp or freely flowable slurry and the proportions of the mixture are so selected that it hardens to a material which is virtually impermeable to water. Such materials can be used to dispose of waste materials, such as waste acids, and to seal underground or surface dumps.

9 Claims, No Drawings

PROCESS OF SAFELY DISPOSING OF WASTE MATERIALS

CROSS REFERENCE TO RELATED APPLICATIONS

This application is a national phase application corresponding to PCT/EP/00168 filed Oct. 21, 1981 and based upon German national applications of Oct. 21, 1980 and Nov. 1, 1980 under the International Convention. Priority is claimed as to these earlier applications under the Patent Cooperation Treaty and the International Convention.

Field of the Invention

This invention relates to a process for safely disposing of waste materials which are solid or contained in aqueous liquids, wherein brown coal ash is used.

Background of the Invention

It is known from German Patent Publication 26 52 107 that residues which consist of dust or sludge and contain metal compounds can be agglomerated by a treatment, e.g., quicklime in order to transform them to granular solids, which can be dumped. Owing to their large surface area, their residual porosity and their low bulk density, the polluting constituents of the resulting granular solids which have been dumped may be leached out. In another process, disclosed in German Patent Publication No. 26 38 224, reactive viscous waste materials which have become available in the production of pesticides and contain chlorine and sulfur are mixed with alkaline powders and after an addition of water are transformed to flowable solids. Brown coal ash is not used in that process. German Patent Publication No. 29 25 882 discloses a process in which sulfate-containing brown coal ash is pulped by an addition of water and the resulting pulp is dumped and subsequently hardens. Additional waste materials are not added to the mixture obtained in that process.

Object of the Invention

It is an object of the invention to provide a process in which toxic waste materials or production residues, which may be solid or dissolved or suspended in aqueous liquids, can be transformed in a simple and economical manner to solids which can safely be dumped.

DESCRIPTION OF THE INVENTION

In a process of safely disposing of waste materials which are solid or contained in aqueous liquids, wherein the waste material is treated with alkaline substances and a solid product is formed, that object is accomplished in accordance with the invention in that the waste materials which are solid or dissolved or suspended in aqueous liquids are mixed with brown coal ash and, if desired, water, to form a homogeneous mixture having the consistency of a pulp or a freely flowable slurry and the proportions of the ingredients of the mixture are so selected that the mixture hardens to a virtually waterimpermeable material.

In the process according to the invention, the alkaline substance which is used consists of brown coal ash which becomes available in large quantities in power plants and which also gives rise to dumping problems because it contains sulfates which tend to pollute the ground water.

The ash used in the process according to the invention may consist of unmoistened dustlike ash, which becomes available in the ash bins of the power plants, as well as moistened power plant ash, such as is dumped into brown coal pit mines.

Such power plant ash is composed of the mineral content of pure brown coal and of sand and clay which have been mined together with the brown coal. A major part of said ash consists of very fine-grained ash which has been collected in electrostatic precipitators; a minor part consists of coarse-grained boiler furnace ash, which has a high sand content.

The chemical and physical behavior of brown coal ash depends highly on its calcium content, which is present as the oxide, ferrite and sulfate of calcium. The high reactivity of the ash is increased by its small particle size and its large surface area.

The process according to the invention may be used to bind various waste materials so that they will not pollute the environment. Such waste materials may be available as solids or as aqueous suspensions or sludges or as aqueous solutions and may consist, of solid iron oxide catalysts, which may be enriched with catalyst poisons, such as soluble arsenic compounds, or of filter-collected dusts from foundries and metallurgical plants, or of slags and residues from roasting, or of sludges derived from blast furnace gas and from electroplating plants, or of other waste materials which contain water-soluble heavy metal compounds or other pollutants. Up to 50% by weight of other solids can usually be admixed to the brown coal ash without adversely affecting its setting characteristics. Solid waste materials are usually available in the form of a powder or of granules and sometimes also in the form of lumps and are suitably mixed in a dry state with the brown coal ash from power plants. Water is then added to the resulting mixture in the required proportion, which usually amounts to 20 to 40% by weight of the brown coal ash. Additional waste materials which can be bound in a desirable manner in the process according to the invention consist of waste acids, which becomes available in numerous chemical processes, for instance, in the leaching of ore and in the pickling of metal with solutions containing sulfuric acid or in the production of organic color pigments. Such waste acids have a relatively low acid concentration and are contaminated with salts.

In a preferred embodiment of the process according to the invention, waste acid which has become available in the solublization of titanium-containing ores for the production of titanium dioxide pigments is bound as a waste material. To obtain a solid end product which is compact and virtually water-impermeable, we must form a homogeneous mixture which contains the waste acid and the brown coal ash in a predetermined weight ratio, and the mixture must be stirred until a pulp has been obtained. It has been found that a mixing ratio of 100 parts by weight of ash to 50 to 75 parts by weight, preferably 60 to 65 parts by weight, of waste acid from the production of titanium dioxide will be desirable if the brown coal ash has an average CaO content of about 10% by weight and the waste acid has an average $H_2SO_4$ content of about 12%. In case of lower CaO contents of the ash or higher concentrations of acid or iron sulfate in the waste acid, the mixture must be diluted with water because a pulp must be formed in any case.

The mixed pulp consisting of brown coal ash and waste acid may be further compacted by a mechanical treatment, e.g., in that it is vibrated or acted upon by the track chains of tracklaying vehicles or by rolls, and as a result of the exothermic chemical reactions sets after a short time like a cement.

To ensure that the heavy metal salts contained in the waste acid will be combined, the mixture is so constituted that it is basic and solidifies to form a compact material. As a result, an elution of the heavy metal salts will be virtually prevented and ground water will not be polluted.

In accordance with the invention, different waste materials can be safely disposed of because waste acids, such as the waste acid from the production of titanium dioxide, as well as brown coal ash from power plants can be prepared for being safely disposed in a single process step. Because the solidified compact mixture of brown coal ash from power plants and waste acid from the production of titanium dioxide is virtually impermable to water, the sulfates contained in the brown coal ash can no longer be eluted by rain water or ground water. The heavy metals contained in the waste acid are contained in the compact product either as a precipitate or as an absorbate or adsorbate and cannot be eluted.

It is apparent that in the process according to the invention the mixing of, e.g. waste acid and brown coal ash from power plants, i.e. two basically different waste materials, which must not be dumped as such, results in a single solid product, which is so dense and compact that it is no longer permable to water and can safely be disposed of a sanitary dump.

The process according to the invention eliminates the need for a chemical processing of the waste acid from the production of titanium dioxide. Such chemical processing involves high investments and a high consumption of energy and requires special measures for the elimination of the special waste which is obtained. As the ocean dumping of such waste acid will no longer be permissible in future for ecological reasons, the process according to the invention provides a simple and economical solution to that problem.

In commercial operation, the brown coal ash from power plants may be supplied by conveyors and the waste acid may be supplied in pipelines. The two ingredients are mixed in the required proportion in a mixing plant at the location where the resulting inert, compact product is to be dumped. The supply, mixing and dumping may be effected continuously. The mixing plant may desirably be mounted on a dumping vehicle.

In accordance with another preferred feature of the invention the mixture obtained in the process according to the invention is used to seal waste dumps. Dumps used for the disposal of waste materials which might pollute the ground water near the dump have previously been sealed with pure clay or such waste materials have been dumped into abandoned clay pits, which are lined at the bottom and on the side faces with natural clay deposits in a thichness of several meters. Owing to the shortage of clay and the lack of abandoned clay pits, welded films of plastic material have been used on a large scale as a material for lining dumps for such waste materials. The need for such practices is eliminated by the process according to the invention.

In accordance with the invention, the bottom and sides of waste dumps can be so effectively sealed that a percolation of aqueous liquids which contain pollutants into the adjacent soil will be prevented so that a pollution of the ground water will be virtually precluded. Any aqueous liquids collecting at the bottom of the dump can be collected and withdrawn by suitable drains and can then safely be disposed of.

In case of need, the dump may be sealed also at its top with the material obtained by the process according to the invention so that precipitated water cannot enter the dump.

In civil engineering and hydraulic engineering, the material obtained by the process according to the invention may be used to provide seals for preventing an inflow of ground water and/or surface water. For instance, building pits, cuttings for roads, canal structures etc. can be protected in this manner against an inflow of water.

The thickness of the sealing layer required for various purposes and the thickness and number of the individual layers will depend on the nature of the waste materials to be dumped and on the required sealing measures and on local hydrological conditions.

The mixture obtained by the process according to the invention can also be used to advantage to fill underground cavities which exist naturally or have been formed by mining. For this purpose it has been found to be suitable to add water in such a proportion and at such a time to the mixture of brown coal ash and waste material that a freely flowable mixed slurry is formed, which can be transported to the location where it is to be deposited. If water is added in such a higher proportion that a freely flowable slurry rather than a pulp is formed, the sealing to prevent an inflow of water may be effected in a hydraulic operation and the mixture will subsequently also solidify to form a compact, dense material which is virtually impermeable to water.

The process according to the invention may also be used to fill and seal cavities remaining in underground dumps which contain encapsulated pollutants, such as radioactive or chemical waste materials, so that additional protection is afforded.

In mining, the process according to the invention may be used, e.g., for underground filling operations in that the mine waste is admixed to a freely flowable slurry consisting of brown coal ash and water. In that case the cavities which would otherwise remain open when the mine waste has been placed are substantially filled so that the settlement can be decisively reduced as well as the subsidence on the surface.

Abandoned roadway sections may be filled in the same manner so as to seal them against an inflow of water. In that case the need for draining the roadways which are in operation can be greatly decreased.

The locations where mine waste is dumped on the surface or in abandoned mines may also be sealed in an economical manner by the process according to the invention so that sulfates, chlorides and other pollutants which may be formed by the disintegration of the mine waste cannot enter the ground water. Any polluted water which has percolated through the mine waste can be withdrawn by drains provided on the surface of the compact layer formed by the process according to the invention and can then be safely disposed of.

Cleaved rock, e.g. in limestone quarries, may also be filled with a freely flowable slurry consisting of the mixture formed by the process according to the invention so that fissures, fractures and gaps between strata can be filled to a large depth. In this way a complete sealing can be effected; this is not possible with the methods previously adopted in the handling of waste materials. Abandoned quarries can thus be treated by the process according to the invention at low cost so that they can be used for a safe disposal of waste materials.

The advantages afforded by the invention reside in that waste materials which would pollute particularly the water are transformed by the process according to the invention to a compact solid material, which is virtually impermeable to water and from which any pollutants, such as heavy metals, cannot be eluted with water so that such material can be deposited in any sanitary dump. Besides, the material can safely be used to seal dumps against an inflow of ground and surface water. The dumps may finally be covered with natural soil material so that the recovered areas will be available for any desired use.

Specific Examples

The invention will be explained more in detail in the subsequent examples.

Example 1

(A)

(a) Mixtures of 100 parts by weight of brown coal ash from power plants and of 60 to 65 parts by weight of 12% waste acid from the production of titanium dioxide were prepared.

(b) Mixtures of 100 parts by weight of brown coal ash from power plants and of 70 parts by weight of waste acid which contained 15 to 20% $H_2SO_4$ and was obtained in the production of organic color pigments were prepared.

The mixtures made in accordance with paragraphs (a) and (b) above were filled into steel cylinders having a capacity of 100 milliliters and sealed at the bottom by plastic caps and were compacted in said cylinders by being vibrated. After some days, the specimens were tested for water permeability in the $K_f$ tester according to K. E. Wit under a pressure difference of about 10 mm of water. The results have been compiled in Table 1.

TABLE 1

Permeability to Water ($K_f$ in m/s) of Test Specimens of Brown Coal Ash and Waste Acid (a) Waste Acid Obtained From the Production of Titanium Dioxide and Used in a Weight Ratio of

| 100:60 | 100:65 |
|---|---|
| $5.4 \times 10^{-8}$ | $9.1 \times 10^{-8}$ |
| $9.3 \times 10^{-8}$ | $7.2 \times 10^{-8}$ |
| $4.6 \times 10^{-8}$ | $2.5 \times 10^{-8}$ |
| $3.9 \times 10^{-8}$ | $4.9 \times 10^{-8}$ |
| $3.2 \times 10^{-8}$ | $4.5 \times 10^{-8}$ |
| $2.3 \times 10^{-8}$ | $4.4 \times 10^{-8}$ |
| $2.8 \times 10^{-8}$ | $2.5 \times 10^{-8}$ |
| $1.6 \times 10^{-8}$ | $1.6 \times 10^{-8}$ |

(b) Waste Acid Obtained From the Production of Organic Color Pigments and Used in a Weight Ratio of 100:70

| |
|---|
| $3.6 \times 10^{-8}$ |
| $1.8 \times 10^{-8}$ |
| $7.9 \times 10^{-8}$ |
| $8.5 \times 10^{-8}$ |
| $8.2 \times 10^{-8}$ |
| $1.4 \times 10^{-8}$ |
| $7.2 \times 10^{-8}$ |

(B)

In order to ascertain which substances can be eluted from the product formed in accordance with the invention, particularly as regards the heavy metals contained in the waste acid, elution tests were conducted in accordance with regulations which are presently in force. For this purpose, test specimens having a weight of 300 grams were treated for 24 hours with continuously circulated distilled water in ten times the quantity of the test specimens. The clear filtrate was evaporated and the evaporation residue was analyzed. The results have been compiled in Table 2, from which it is apparent that for all heavy metals which were analyzed the concentrations ascertained by X-ray fluorescence analysis are below the values which are permissible even for drinking water. It is emphasized that there are no essential differences between the eluates obtained from ecologically safe test specimens made with waste acid from the production of titanium dioxide and from the production of color pigments.

The organic constituents which are contained in waste acid from the production of color pigments and which are regarded as particularly problematic are also bound to a large extent, see Table 2. When a waste acid was used which contained 1% (10,000 ppm) benzenesulfonic naphtalenesulfonic and anthraquinonesulfonic acids and 10 ppm organic halogen compounds, the resulting test specimens consisting of ash and waste acid contained only 11 ppm DCC (diluted organic carbon) and less than 0.06 ppm EOCL (extractable organic chlorine).

TABLE 2

Elute From Test Specimens of Brown Coal Ash and Waste Acid (a) Waste Acid From the Production of Titanium Dioxide

| | |
|---|---|
| Vanadium | less than 0.03 ppm |
| Chromium | less than 0.03 ppm |
| Nickel | less than 0.03 ppm |
| Copper | less than 0.03 ppm |
| Zinc | less than 0.03 ppm |
| Lead | less than 0.03 ppm |

(b) Waste Acid From the Production of Color Pigments

| | |
|---|---|
| Vanadium | less than 0.04 ppm |
| Chromium | 0.04 ppm |
| Nickel | less than 0.04 ppm |
| Copper | less than 0.04 ppm |
| Zinc | 0.05 ppm |
| Lead | less than 0.04 ppm |
| Arsenic | less than 0.04 ppm |
| DOC (diluted organic carbon) | 11.0 ppm |
| EOCL (extractable organic chlorine) | less than 0.06 ppm |

TABLE 3

Average Analysis of Waste Acids From the Production of Color Pigments

| | |
|---|---|
| $H_2SO_4$ | 15–20% |
| Benzenesulfonic, naphtalenesulfonic and anthraquinonesulfonic acids | 1% |
| Fe | 100 ppm |
| Cr | 20 ppm |
| Cu, Zn | 1–10 ppm |
| Ni, V, Pb, Hg | 0.1–1 ppm |
| As, Cd, Ag | less than 0.1 ppm |
| Organic halogen compounds | 10 ppm |

TABLE 4

Average Analysis of Waste Acids of Different Origins, Obtained by the Leaching of Ilmenite (a, b) and Sorel Slag (c)

| | | | |
|---|---|---|---|
| pH value | below 1 | below 1 | below 1 |
| $CS^B$, approx. | 7 g $O_2$/l | 9 g $O_2$/l | 5 g $O_2$/l |
| Free $H_2SO_4$, | 12% | 12% | 23% |

TABLE 4-continued

Average Analysis of Waste Acids of Different Origins, Obtained by the Leaching of Ilmenite (a, b) and Sorel Slag (c)

| | approx. (a) | (b) | (c) |
|---|---|---|---|
| $TiOSO_4$, approx. | 1.0% | 0.8% | not stated |
| $MgSO_4$, approx. | 2.0% | 1.0% | not stated |
| $MnSO_4$, approx. | 0.1% | 0.07% | not stated |
| $Al_2(SO_4)_3$ | not stated | max. 0.2% | not stated |
| $Na_2SO_4$ | not stated | max. 0.03% | not stated |
| $CaSO_4$ | not stated | max. 0.07% | not stated |
| Iron | max. 50,000 mg/l | approx. 65,000 mg/l | max. 2.1% |
| Vanadium | max. 350 mg/l | approx. 110 mg/l | max. 0.05% |
| Chromium | max. 200 mg/l | approx. 200 mg/l | max. 0.03% |
| Zinc, max. | 20 mg/l | 40 mg/l | 80 mg/l |
| Lead, max. | 2 mg/l | 2 mg/l | 10 mg/l |
| Nickel | not stated | approx. 15 mg/l | max. 3 mg/l |
| Copper, max. | 1.5 mg/l | 1.5 mg/l | 2 mg/l |
| Cadmimum | n.d.+ | n.d.+ | max. 0.2 mg/l |
| Mercury | n.d.++ | n.d.++ | max. 0.03 mg/l |
| Arsenic | n.d.+++ | n.d.+++ | n.d.+++ | n.d. = not detected above the following detection thresholds:
+0.1 mg/l
++0.01 mg/l
+++0.01 mg/l

Example 2

This example illustrates the binding of a solid waste material in a mixture of brown coal ash and water. The solid waste material consisted of a spent iron oxide catalyst such as becomes available in the petrochemical industry. Such spent catalyst contains so much water-soluble arsenic that it may be dumped only in a dump for special waste. The catalyst used consisted of compacts in a size of up to one or more centimeters. When this material was treated in an elution test for 24 hours with continually circulated distilled water in a ratio of 1:10, the resulting filtrate contained 1.3 mg/l arsenic.

From a mixture of 30 parts by weight of waste catalyst, 100 parts by weight of brown coal ash and 20 to 40 parts by weight of water, a compact, dense test specimen was formed, which was extremely hard and exhibited a water permeability $K_f$ of $9 \times 10^{-10}$ m/s. A corresponding elution test resulted in an eluate leaving an arsenic content below the detection threshold of 0.03 mg/l, i.e. below the limit of 0.05 mg/l which is permissible for drinking water.

We claim:

1. A process for the safe disposal of a waste material in solid form or contained in an aqueous liquid which comprises the steps of:
   homogeneously mixing said waste material and a basic power plant brown coal ash to form a homogeneous mixture having a consistency of a pulp or freely flowable slurry;
   controlling the proportion of the basic brown coal ash in said mixture so that the mixture is hardenable to a virtually water-impermeable state;
   depositing said mixture; and
   permitting the mixture to harden to a virtually water impermeable material.

2. The process defined in claim 1 wherein said waste material includes a waste acid dissolved in water.

3. The process defined in claim 2 wherein the waste acid is derived from the production of titantium dioxide or an organic color pigment.

4. The process defined in claim 1 wherein for each hundredth part by weight of said brown coal ash the proportions of the mixture are adjusted to include about 50 to 75 parts by weight of waste acid from the production of titanium dioxide is used.

5. The process defined in claim 4 wherein said mixture contains 60 to 65 parts by weight of said waste acid per 100 parts by weight of the brown coal ash.

6. The process defined in claim 1 wherein said waste material if in a solid form and a homogeneous mixture of said waste material and the brown coal ash is formed before water is added thereto.

7. The process defined in claim 1 wherein said proportions are such that the water impermeable material is basic and the heavy metals contained therein are bound so as not to leach from a water impermeable material.

8. The process defined in claim 1 wherein said mixture is deposited on a surface of a waste dump which is sealed by the water impermeable material.

9. The process defined in claim 1 wherein said mixture is filled into underground cavities to seal the same with water impermeable material.

* * * * *

UNITED STATES PATENT AND TRADEMARK OFFICE
CERTIFICATE OF CORRECTION

PATENT NO. : 4,456,400

DATED : 26 June 1984

INVENTOR(S) : Günter HEIDE et al

It is certified that error appears in the above-identified patent and that said Letters Patent is hereby corrected as shown below:

On the title page:
In the heading, left column, item [76], please change the second inventor's name to read:

--Hans WERNER --.

Signed and Sealed this

Nineteenth Day of March 1985

[SEAL]

Attest:

DONALD J. QUIGG

Attesting Officer     Acting Commissioner of Patents and Trademarks